US011272018B2

(12) United States Patent
Lyman et al.

(10) Patent No.: US 11,272,018 B2
(45) Date of Patent: *Mar. 8, 2022

(54) DETECTING USER LOCATION AND ACTIVATING AND DEACTIVATING LOCATION-BASED COOKIES BASED ON DETECTED USER LOCATION

(71) Applicant: PAYPAL, INC., San Jose, CA (US)

(72) Inventors: Nate L. Lyman, Livermore, CA (US); Roy L. Camp, Cupertino, CA (US); Eric J. Farraro, San Jose, CA (US); John R. Tapley, San Jose, CA (US)

(73) Assignee: PAYPAL, INC., San Jose, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/227,857

(22) Filed: Dec. 20, 2018

(65) Prior Publication Data

US 2019/0297152 A1    Sep. 26, 2019

Related U.S. Application Data

(63) Continuation of application No. 15/170,690, filed on Jun. 1, 2016, now Pat. No. 10,165,060, which is a (Continued)

(51) Int. Cl.
*H04L 29/08* (2006.01)
*G06Q 30/02* (2012.01)
(Continued)

(52) U.S. Cl.
CPC .......... *H04L 67/18* (2013.01); *G06Q 30/0255* (2013.01); *H04L 67/02* (2013.01);
(Continued)

(58) Field of Classification Search
CPC .......... G01S 5/02; G01S 5/0252; G01S 19/14; G06F 13/00; G06F 16/9537; G06F 17/30;
(Continued)

(56) References Cited

U.S. PATENT DOCUMENTS 6,138,142 A    10/2000 Linsk
6,421,729 B1    7/2002 Paltenghe et al.
(Continued)

FOREIGN PATENT DOCUMENTS

CN    1732700 A    2/2006
JP    2000-076189    3/2000
(Continued)

OTHER PUBLICATIONS

European Office Action for Application No. 14839649.2, dated Jan. 10, 2018, 6pgs.

*Primary Examiner* — Robert B Harrell
(74) *Attorney, Agent, or Firm* — Haynes and Boone, LLP

(57) ABSTRACT

A communication device may have a set of web cookies designated for a specific location. When the communication device enters the specific location, the set of web cookies, which are designated for the specific location, may be used to customize a web page displayed at the communication device. When the communication device exits the specific location, the set of web cookies, which are designated for the specific location, may be inactivated. Different sets of web cookies may be designated for different locations. For example, a set of web cookies may be designated for home and another set of web cookies may be designated for work. The communication device may activate an appropriate set of web cookies based on the location of the communication device.

20 Claims, 4 Drawing Sheets

Related U.S. Application Data continuation of application No. 14/013,950, filed on Aug. 29, 2013, now Pat. No. 9,363,323.

(51) Int. Cl.

| | | |
|---|---|---|
| *H04W 4/02* | (2018.01) | |
| *G06F 16/9537* | (2019.01) | |
| *H04L 67/52* | (2022.01) | |
| *H04L 67/02* | (2022.01) | |
| *H04L 67/142* | (2022.01) | |
| *H04L 67/53* | (2022.01) | |

(52) U.S. Cl.
CPC ............ *H04L 67/142* (2013.01); *H04L 67/20* (2013.01); *H04W 4/025* (2013.01); *G06F 16/9537* (2019.01)

(58) Field of Classification Search
CPC .... G06F 17/3087; G06F 21/6218; G06F 7/00; G06F 17/30067; G06F 17/30286; G06F 17/30595; G06Q 30/00; G06Q 30/02; G06Q 30/0255; G06Q 30/0251; G06Q 30/0261; G06Q 30/0267; G06Q 30/0269; G06Q 30/0273; G06Q 30/0277; G06Q 10/10; H04L 29/06; H04L 29/08; H04L 29/08072; H04L 29/08657; H04L 41/12; H04L 41/22; H04L 41/0213; H04L 63/08; H04L 63/10; H04L 63/102; H04L 67/02; H04L 67/18; H04L 67/20; H04L 67/142; H04L 67/00; H04W 4/02; H04W 4/025; H04W 12/06; H04W 64/00
USPC .................................. 709/223; 707/999.001
See application file for complete search history.

(56) References Cited

U.S. PATENT DOCUMENTS

| | | |
|---|---|---|
| 7,136,631 B1 | 11/2006 | Jiang et al. |
| 8,335,526 B2 | 12/2012 | Shankaranarayanan et al. |
| 8,756,326 B1 | 6/2014 | Elberse et al. |
| 2002/0120629 A1* | 8/2002 | Leonard ................. G06Q 30/02 |
| 2003/0018887 A1 | 1/2003 | Fishman et al. |
| 2004/0044657 A1 | 3/2004 | Lee |
| 2004/0049673 A1 | 3/2004 | Song et al. |
| 2004/0102197 A1 | 5/2004 | Dietz |
| 2004/0127232 A1 | 7/2004 | Kotzin |
| 2006/0273930 A1 | 12/2006 | Godden |
| 2007/0239852 A1 | 10/2007 | Kotzin |
| 2007/0288304 A1 | 12/2007 | Gutierrez et al. |
| 2008/0033646 A1 | 2/2008 | Morgan et al. |
| 2008/0195477 A1 | 8/2008 | Kennedy et al. |
| 2008/0244046 A1 | 10/2008 | Campbell et al. |
| 2009/0037602 A1 | 2/2009 | Patel et al. |
| 2009/0113532 A1 | 4/2009 | Lapidous |
| 2009/0187575 A1 | 7/2009 | DaCosta |
| 2010/0121718 A1 | 5/2010 | Dietz |
| 2010/0125794 A1 | 5/2010 | Hampton et al. |
| 2010/0159955 A1 | 6/2010 | Aerrabotu |
| 2010/0211997 A1 | 8/2010 | McGeehan et al. |
| 2010/0280874 A1 | 11/2010 | Thorn |
| 2012/0240200 A1 | 9/2012 | Lapidous |
| 2012/0317652 A1 | 12/2012 | Kiley |
| 2013/0091452 A1 | 4/2013 | Sorden et al. |
| 2013/0151950 A1 | 6/2013 | McEvilly et al. |
| 2014/0006925 A1 | 1/2014 | Bassemir et al. |

FOREIGN PATENT DOCUMENTS

| | | |
|---|---|---|
| KR | 2000-072482 | 12/2000 |
| WO | WO 00/79449 | 12/2000 |
| WO | WO 02/102025 A1 | 12/2002 |
| WO | WO 2013/070769 A2 | 5/2013 |

* cited by examiner

DETECTING USER LOCATION AND ACTIVATING AND DEACTIVATING LOCATION-BASED COOKIES BASED ON DETECTED USER LOCATION

CROSS REFERENCE TO RELATED APPLICATION

This application is a continuation of U.S. patent application Ser. No. 15/170,690 filed on Jun. 1, 2016, now U.S. Pat. No. 10,165,060, which is a continuation of U.S. patent application Ser. No. 14/013,950 filed on Aug. 29, 2013, now U.S. Pat. No. 9,363,323 the complete disclosure[s] of which are incorporated by reference in their entirety.

BACKGROUND

Field of the Invention

The present invention generally relates to systems and methods for implementing location-based web cookies.

Related Art

Internet browsers use web cookies to remember and keep track of user interactions with webpages. For example, web cookies are used to remember user inputs, such as login name and passwords. Web cookies also are used to keep track of user's browsing activities. Thus, online service providers may customize webpages using web cookies to improve user experience. Nevertheless, there are security and privacy concerns regarding the use of web cookies. A conventional internet browser stores one global set of web cookies, without differentiation of locations. The global set of web cookies may be accessed by various internet servers via the internet browser from all locations. Access to the web cookies without restriction may cause security and privacy concerns. Although there are internet browsers that allow anonymous browsing, the anonymous internet browser prevents the use of any web cookies and foregoes the benefit of webpage customization. Therefore, there is a need for a system or method that improves security and privacy when using web cookies for internet browsing.

Figure 1:
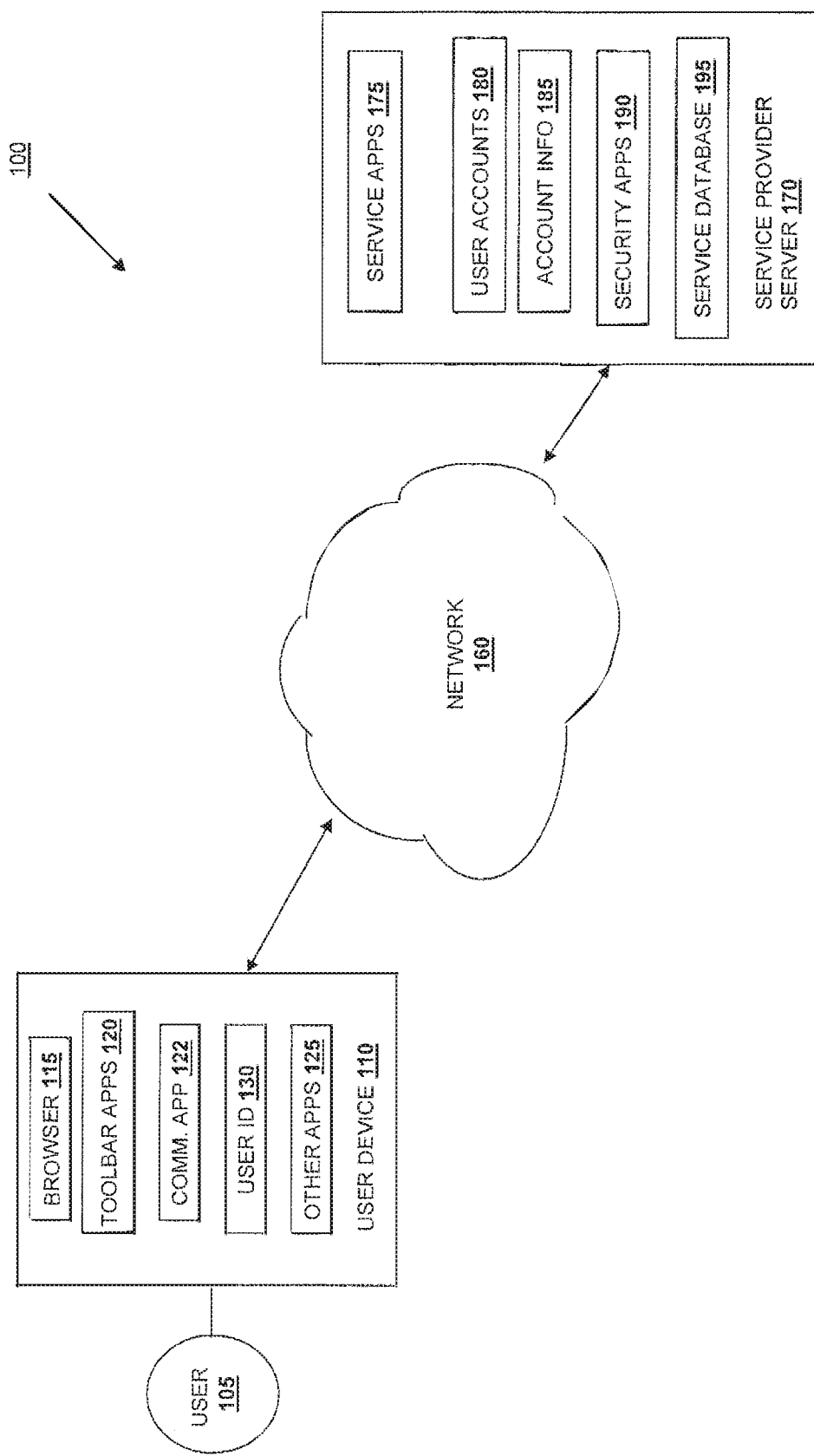
FIG. 1 is block diagram of a networked system suitable for implementing location-based web cookies according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

According to an embodiment, a set of one or more web cookies may be designated for a specific location. When a communication device enters the specific location, the set of web cookies, which are designated for the specific location, may be activated. When the communication device exits the specific location, the set of web cookies, which are designated for the specific location, may be deactivated. Different sets of web cookies may be designated for different locations. For example, a set of web cookies may be designated for home and another set of web cookies may be designated for work. The communication device may activate an appropriate set of web cookies based on the location of the communication device.

FIG. 1 is a block diagram of a networked system 100 configured to facilitate location-based web cookies in accordance with an embodiment of the invention. Networked system 100 may comprise or implement a plurality of servers and/or software components that operate to perform various payment transactions or processes. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

System 100 may include a user device 110 and a service provider server 170 in communication over a network 160. Service provider server 170 may be maintained by an online service provider, such as PayPal, Inc. of San Jose, Calif. A user 105, such as a sender or consumer, utilizes user device 110 to conduct business using service provider server 170. For example, a user 105 may utilize user device 110 to receive information, initiate a payment transaction, receive a transaction approval request, or reply to the request. Note that transaction, as used herein, refers to any suitable action performed using the user device, including payments, transfer of information, display of information, etc.

User device 110 and service provider server 170 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160.

Network 160 may be implemented as a single network or a combination of multiple networks. For example, in various embodiments, network 160 may include the Internet or one or more intranets, landline networks, wireless networks, and/or other appropriate types of networks.

User device 110 may be implemented using any appropriate hardware and software configured for wired and/or wireless communication over network 160. For example, in one embodiment, user device 110 may be implemented as a personal computer (PC), a smart phone, personal digital assistant (PDA), laptop computer, and/or other types of computing devices capable of transmitting and/or receiving data, such as an iPad™ from Apple™.

User device 110 may include one or more browser applications 115 which may be used, for example, to provide a convenient interface to permit user 105 to browse information available over network 160. For example, in one embodiment, browser application 115 may be implemented as a web browser configured to view service information provided from service provider server 170 via the Internet. Browser application 115 may implement web cookies to remember and keep track of user interaction with web browser.

Browser application 115 may implement location-based web cookies based on the location of user device 110. For example, browser application 115 may store different sets of web cookies. Each set of one or more web cookies may be designated for a specific location. The sets of web cookies may be encrypted or password protected to provide additional security. User device 110 may also include one or more toolbar applications 120 which may be used, for example, to provide client-side processing for performing desired tasks in response to operations selected by user 105. In one embodiment, toolbar application 120 may display a user interface in connection with browser application 115.

User device 110 may further include other applications 125 as may be desired in particular embodiments to provide desired features to user device 110. For example, other applications 125 may include security applications for implementing client-side security features, programmatic client applications for interfacing with appropriate application programming interfaces (APIs) over network 160, or other types of applications.

Applications 125 may also include email, texting, voice and IM applications that allow user 105 to send and receive emails, calls, and texts through network 160, as well as applications that enable the user to communicate, transfer information, make payments, and otherwise utilize a smart wallet through the payment provider as discussed above. User device 110 may include one or more user identifiers 130 which may be implemented, for example, as operating system registry entries, cookies associated with browser application 115, identifiers associated with hardware of user device 110, or other appropriate identifiers, such as used for payment/user/device authentication. In one embodiment, user identifier 130 may be used by a payment service provider to associate user 105 with a particular account maintained by the payment provider. A communications application 122, with associated interfaces, enables user device 110 to communicate within system 100.

User device 110 may include applications for collecting environmental data, such as geo-location data via Global Positioning System (GPS), signals from geo-fencing devices, temperature data, altitude data, humidity data, data regarding device movement, ambient sound data, imaging data via a camera, and etc. These environmental data may be utilized to determine a location or environment in which user device 110 is located.

Service provider server 170 may be maintained, for example, by an online service provider which may provide online service to user 105. In this regard, service provider server 170 includes one or more service applications 175 which may be configured to interact with user device 110 over network 160 to facilitate the services and communicate/display information at user device 110. For example, service provider server 170 may provide services, such as payment transaction, banking, retail shopping, and etc.

Service provider server 170 also may maintain a plurality of user accounts 180, each of which may include account information 185 associated with users. For example, account information 185 may include private financial information of users of devices such as account numbers, passwords, device identifiers, user names, phone numbers, credit card information, bank information, or other financial information which may be used to facilitate online transactions by user 105. Account information 185 may also include security profiles for users or user devices.

Security applications 190, which may be part of service application 175 or separate, may be configured to receive security information from a user device for processing and storage in a service database 195. Security applications 190 may include one or more applications to process and manage security information from user 105. As such, security applications 190 may store details of security profiles from users or user devices, associated secured locations, and etc. Security applications 190 may provide security for location-based web cookies. For example, security applications 190 may provide encryption for location-based web cookies. Certain location-based web cookies may have restricted access based on the location of user device 110. Service application 175 may be further configured to determine the existence of and to manage accounts for user 105, as well as create new accounts if necessary, such as the set up and management user accounts.

Figure 2:
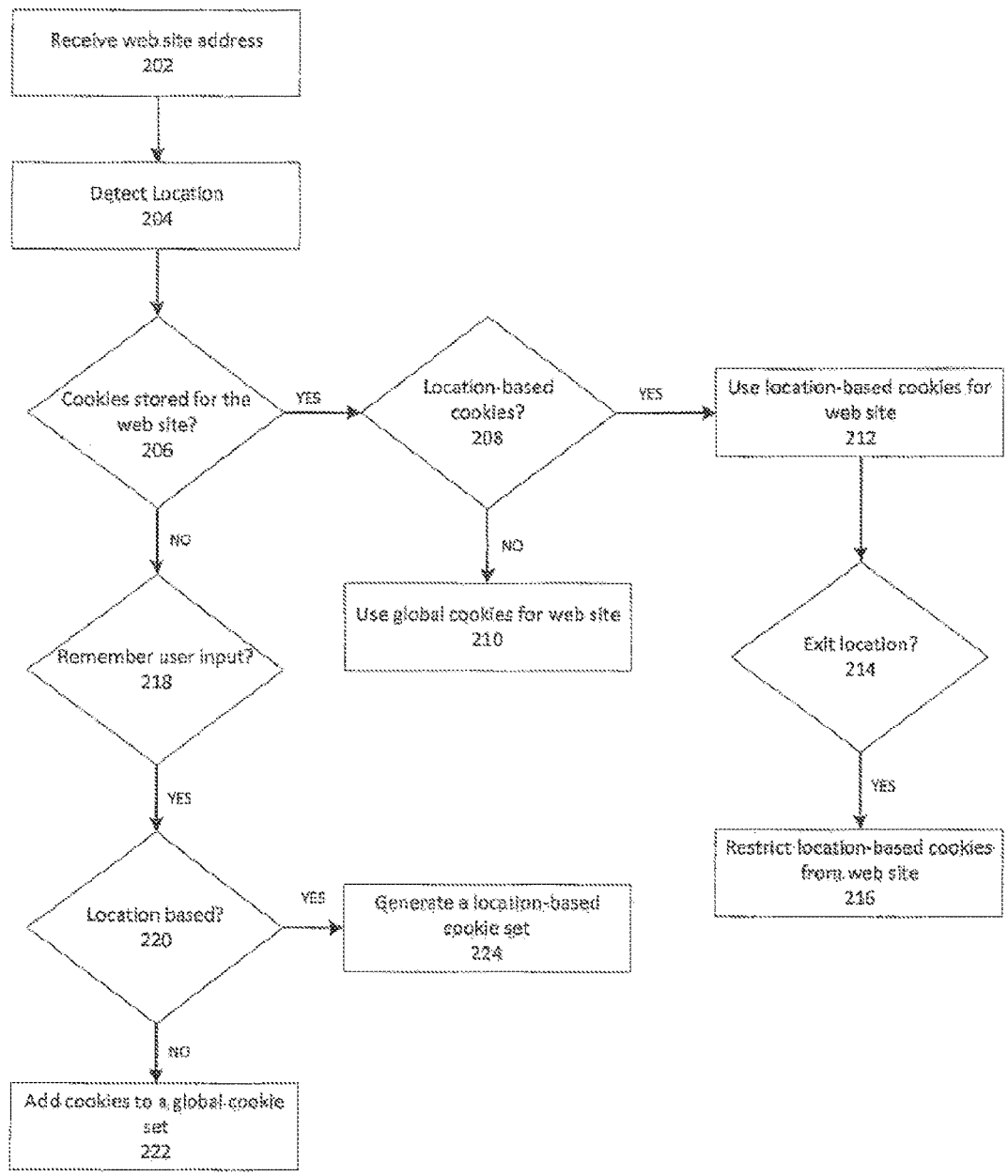
FIG. 2 is a flowchart showing a process for implementing location-based web cookies according to one embodiment.

FIG. 2 is a flowchart showing a process 200 for implementing location-based web cookies according to one embodiment. At step 202, user device 110 may receive information, such as a web address, identifying a web site to visit. The web address may be a Uniform Resource Locator (URL) or a code, such as a QR code, that identifies a web site. The web address may be received from a user input at browser 115 or at an application of user device 110. In one embodiment, the web address may be received from another web site, an email, an instant text message, or the like. The web address may identify a domain name of the web site to be visited or a path to a program to be accessed at a web server, e.g., service provider server 170.

At step 204, user device 110 may detect location or environmental information. For example, user device 110 may detect WiFi signals, Bluetooth signals, available communication networks, geo-fencing signals, geographical location via Global Positioning System (GPS), cellular signals, Near-Field Communication (NFC) signals, and etc. Further, user device 110 may detect date and time, device movement, ambient sound/noise, temperature, humidity, ambient light, and etc. User device 110 may determine a location of user device 110 based on the detected location and/or environmental information.

In one embodiment, user device 110 may send the detected location and/or environmental information to service provider server 170, and service provider server 170 may determine a location of user device 110. A location of user device 110 may be a geographical location or an environmental condition. For example, the location of user device 110 may be a proximity to a GPS coordinate. In another example, the location of user device 110 may be a location in which user device 110 detects a particular communication network, WiFi, Bluetooth, or Near-Field Communication (NFC) network.

At step 206, user device 110 may determine whether web cookies have been stored for the web site to be visited. For example, when a web site was visited previously, web cookies may be generated and stored at user device 110 to remember or keep track of user interaction with the visited web site. The web cookies may be text files and may be labeled with the web address of the visited web site. User device 110 may search for web cookies that match the web address to be visited at step 206.

If web cookies, which are associated with the web address or path to be visited, are found at step 206, user device 110 may determine whether the web cookies are location-based web cookies at step 208. For example, web cookies may selectively be stored in a global folder or location-specific folders. Web cookies stored in a location-specific folder may be designated to be used in the specific location. Thus, if a web cookie is stored in a location-specific folder, user device 110 may determine that the web cookie is a location-specific web cookie. On the other hand, if a web cookie is stored in a global folder, user device 110 may determine that the web cookie is not a location-specific web cookie. Other ways to determine whether the web cookies are location based are also suitable, such as having extensions or an indicator within the cookie that designate it as a location-based cookie.

In one embodiment, based on the location of user device 110 detected in step 204, user device 110 may search for a location-specific folder associated with the detected location of user device 110. If no location-specific folder is associated with the detected location of user device 110, user device 110 may determine that no location-based cookies are found for the location at step 208.

In another embodiment, global web cookies and location-based web cookies may be stored in the same folder. In particular, location-based web cookies may be labeled with the specific location in which the location-based web cookies were generated. Thus, user device 110 may determine whether a web cookie is a location-based web cookies based on the labeling.

If web cookies are found for the web site to be visited at step 206 and the found web cookies are not location-based web cookies, user device 110 may determine that the found web cookies are global web cookies that may be activated or implemented in all locations. At step 210, user device 110 may use the global web cookies regardless of the detected location of user device 110.

For example, browser application 115 of user device 110 may request a web page using the web address received at step 202 and may send the global web cookies to a service provider server indicated by the web address, e.g., service provider server 170. Service provider server 170 may receive the request and customize a web page based on the global web cookies. For example, service provider server 170 may auto-fill forms for the user's convenience. Service provider server 170 also may insert advertisements into the web page based on the user's previous browsing history. Other customization, such as the style, color, and format of the web page also may be implemented based on the web cookies. Service provider server 170 then may send the customized web page to user device 110 to be displayed to the user.

If web cookies are found for the web address to be visited at step 206 and the found web cookies are location-based web cookies, user device 110 may determine whether the location-based cookies match the location of user device 110 detected at step 204. If so, the location-based web cookies may be used for the web address at step 212. For example, browser application 115 of user device 110 may request a web page using the web address received at step 202 and may send the location-based web cookies to a service provider server indicated by the web address, e.g., service provider server 170. In an embodiment, global web cookies may be used in combination with the location-based web cookies when user device 110 is in the location.

At step 212, service provider server 170 may receive the request and customize a web page based on the location-based web cookies. For example, service provider server 170 may insert advertisements into a web page based on the user's previous browsing history at the location. In another example, service provider server 170 may auto-fill private information into a web page when user device 110 is in a secured home location and location-based web cookies for the auto-fill are used for the private information. Service provider server 170 may then send the customized web page to user device 110 to be displayed to a user.

In another embodiment, step 208 may be executed by service provider server 170. For example, user device 110 may send all web cookies associated with the web address to service provider server 170. Service provider server 170 may determine whether the web cookies are location-based cookies based on the labeling on the web cookies. Service provider server 170 also may receive location information of user device 110. Thus, service provider server 170 may determine which web cookies to use to customize the web page based on the labeling on the web cookies and the location of user device 110. For example, if the received web cookies are location-based web cookies and the location of user device 110 matches the labeling on the location-based web cookies, service provider server 170 may use the location-based web cookies to customize the web page.

At step 214, user device 110 may continue to detect or monitor the location of user device 110. User device 110 may determine whether user device 110 has departed from the location. In one embodiment, user device 110 may send location information to service provider server 170 and service provider server 170 may determine whether user device 110 has departed from the location.

If user device 110 has departed from the location, the location-based web cookies, which are associated with the location, may be restricted from being used at step 216. For example, user device 110 may stop sending the location-based web cookies to service provider server 170. In an embodiment, service provider server 170 may continuously receive location information from user device 110, and when service provider server 170 determines that user device 110 departs from the location, service provider server 170 may stop using the location-based web cookies to customize the web pages sent to user device 110.

In one embodiment, location-based web cookies may be used by an online service to keep track of the progress of user activities, such as banking activities or shopping activities. When user device 110 departs from the location, the location-based web cookies may become unavailable to the online service, and the online service may no longer be able to keep track of the progress of user activities. Thus, the user may be logged out of the online service when user device 110 departs from the location. This feature of automatic log out based on location provides additional security for the user when the user forgets to log out of the online service.

In an embodiment, user device 110 may depart from the location and enter a new location. Another set of location-based web cookies may be associated with the new location. Thus, the set of location-based web cookies associated with the new location may be used to customize the web pages when user device 110 enters the new location. If no location-based web cookies are associated with the new location, the global web cookies may be used, as noted above in step 210.

Figure 3A:
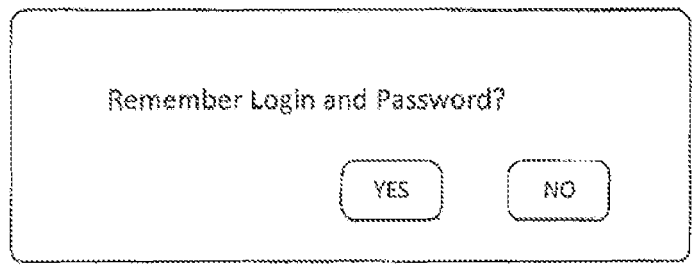
FIG. 3A is a diagram showing a pop-up window according to one embodiment.

Referring now to step 206, if no web cookies are associated with the web address to be visited, user device 110 or service provider server 170 may inquire the user whether cookies should be generated to remember user input and interaction with the web site at step 218. For example, if a user enters login ID and password into a web page, a pop-up window, as shown in FIG. 3A, may appear to inquire whether the user wishes for browser application 115 to remember the login ID and password for the web site.

Figure 3B:
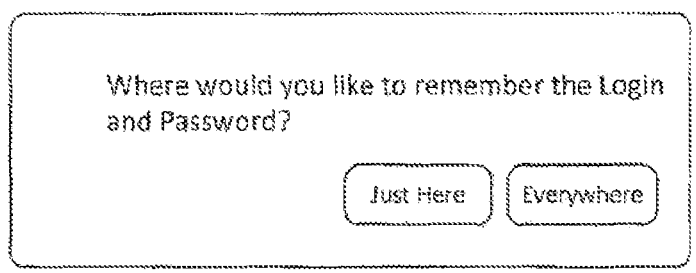
FIG. 3B is a diagram showing another pop-up window according to one embodiment.

If the user indicates that the user input should be remembered at step 218, user device 110 or service provider server 170 then may inquire the user whether the user input should be stored in association with a specific location or globally at step 220. User device 110 may store the web cookies selectively in a global folder or location-specific folders. For example, when the user agrees to remember the login ID and password, a pop-up window, as shown in FIG. 3B, may appear to inquire whether the user wishes for browser application 115 to remember the login ID and password just here, e.g., a specific location, or everywhere, e.g., global.

In one embodiment, user device 110 may display a description of the location of user device 110 in which the user input is to be remembered. For example, if the location is a geographical location of San Jose, Calif., the pop-up window may display: "Would you like to remember the input for San Jose, Calif. or everywhere?" If the location is an environmental condition in which a home network is detected, the pop-up window may display: "Would you like to remember the input when in the home network or everywhere?"

If the user input is to be remembered in a location-specific manner, user device 110 may generate location-based web cookies relating to the user input at step 224. User device 110 may store the location-based web cookies in a location-specific folder, separate from global web cookies. In another embodiment, the location-based web cookies may be labeled with location-specific information and stored in the same folder as global web cookies.

Location-specific folders may be created to store location-based web cookies. The location-specific folders may be organized in a hierarchical manner. For example, a location-specific folder may be created for a country, under which a location-specific folder may be created for a state, under which a location-specific folder may be created for a city. Web cookies from the appropriate location-specific folders may be used based on the location of user device 110. For example, when user device 110 is in San Jose, Calif., web cookies from both the folder for San Jose and the folder for California may be used.

If the user input is to be remembered in a non-location-specific manner, user device 110 may generate global web cookies relating to the user input at step 222. User device 110 may store the global web cookies in a global folder, which may be accessible regardless of the location of user device 110.

By using the above process, location-based web cookies may be used based on the location of a user device. The user may be allowed to choose whether the web browser should remember user input globally, e.g., everywhere, or for a specific location. Web pages may be customized accordingly based on the location of the user device. Thus, appropriate security and privacy may be implemented for the web browser based on the location of the user device.

The following are exemplary situations in which location-based web cookies may be implemented.

Example 1

A user has a mobile device and is using the mobile device at home. The mobile device is connected to a home network. The mobile device detects that the location is home based on the connection to the home network or by a Global Positioning System (GPS). The user uses an internet browser on the mobile device to access an online banking service. The user enters the web address of the online banking service at the internet browser. The mobile device searches and determines whether web cookies associated with the web address are stored with the internet browser. Assuming that no web cookies associated with the web address are stored, the mobile device may send a request for service to the online banking service via the internet.

In response to the request, the online banking service determines that no web cookies are received from the mobile device and sends a standard web page to the mobile device. The standard web page includes fill-in areas for the user to enter a login name and a password associated with the user's banking account. The user enters a login name and a password associated with the banking account in the standard web page. Because no web cookies are stored for the web address, the standard web page prompts the user whether the user input should be remembered. A pop-up window appears at the internet browser to ask whether the user would like to remember the login name and the password for the web site.

If the user agrees to remember the login name and the password for the web site, another pop-up window appears at the internet browser to ask whether the user would like to remember the login name and the password for home or everywhere. If the user selects to have the login name and the password remembered only for home, the mobile device may generate location-based web cookies associated with the web site including the login name and the password. The location-based web cookies may be labeled for the home location or stored in a location-specific folder designated for the home location. Further user inputs and interactions with the online banking service occurred at the home location also may be remembered by generating additional location-based web cookies. Location-based web cookies also are used to keep track of the progress of the online banking session.

When the user finishes with the online banking session, the user may forget to log out of the online banking session. As such, the user leaves home without logging out of the online banking session. The mobile device detects that the mobile device has departed from the home location and restricts access to the location-based web cookies designated for the home location. Thus, the online banking service can no longer access the location-based web cookies and automatically log the user out of the online banking session.

When the user visits the online banking service from home again the next day, the mobile device detects that the mobile device is at home and that the location-based web cookies designated for the home location are stored from previous sessions. The mobile device sends these location-based web cookies to the online banking service. The online banking service then customizes web pages to improve user experience. For example, the online banking service auto-fills login name and password for the user. Further, advertisements for goods and services near the home location also are inserted into the web pages. Thus, location-based web cookies may improve security and user experience.

Example 2

A user uses a laptop computer at home to shop for a gift for the user's child. The user visits online merchants and web cookies are generated from the user's browsing activities. The user sets the internet browser to generate location-based web cookies for the home location. The location-based web cookies generated from the online shopping are stored in a location-specific folder for the home location. While the user is gift shopping at home, the online merchants use the location-based web cookies to insert advertisements for children's gifts into web pages viewed by the user.

The user finishes shopping and leaves home for work. The user also uses the laptop computer at work. The laptop computer detects that it is no longer in the home location. The laptop computer restricts location-based web cookies designated for the home location from being used at work. When the user uses the laptop computer at work, web cookies generated at the home location are not used and advertisements for children's gifts are not inserted into web pages viewed by the user at work. Thus, location-based web cookies may provide appropriate privacy for the user.

Figure 4:
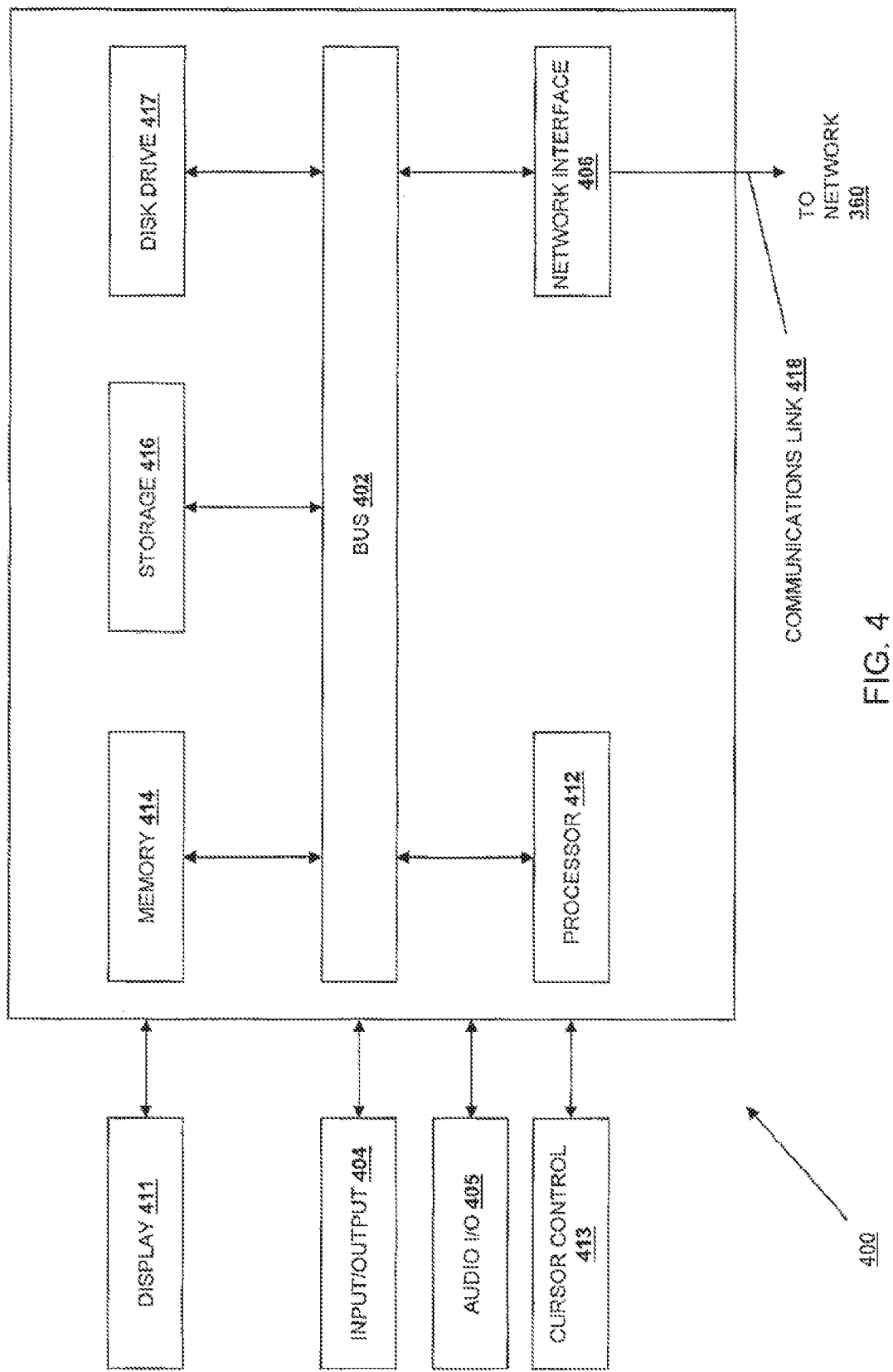
FIG. 4 is a block diagram of a computer system suitable for implementing one or more components in FIG. 1 according to one embodiment.

FIG. 4 is a block diagram of a computer system 400 suitable for implementing one or more embodiments of the present disclosure. In various implementations, the user device may comprise a personal computing device (e.g., smart phone, a computing tablet, a personal computer, laptop, PDA, Bluetooth device, key FOB, badge, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. I/O component 404 may also include an output component, such as a display 411 and a cursor control 413 (such as a keyboard, keypad, mouse, etc.). An optional audio input/output component 405 may also be included to allow a user to use voice for inputting information by converting audio signals. Audio I/O component 405 may allow the user to hear audio. A transceiver or network interface 406 transmits and receives signals between computer system 400 and other devices, such as another user device, a merchant server, or a payment provider server via network 360. In one embodiment, the transmission is wireless, although other transmission mediums and methods may also be suitable. A processor 412, which can be a micro-controller, digital signal processor (DSP), or other processing component, processes these various signals, such as for display on computer system 400 or transmission to other devices via a communication link 418. Processor 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor 412 and other components by executing one or more sequences of instructions contained in system memory component 414. Logic may be encoded in a computer readable medium, which may refer to any medium that participates in providing instructions to processor 412 for execution. Such a medium may take many forms, including but not limited to, non-volatile media, volatile media, and transmission media. In various implementations, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:
1. A computer system comprising:
a non-transitory memory; and
one or more hardware processors coupled to the non-transitory memory and configured to read instructions from the non-transitory memory to cause the computer system to perform operations comprising:

receiving sensor data from a device of a user, the sensor data including Global Positioning System (GPS) data, Wi-Fi signal data, cellular signal data, Bluetooth signal data, or Near Field Communication (NFC) data;

analyzing the received sensor data to determine a geographic location of the device;

searching, on the device, for a one or more objects that are associated with the geographic location;

identifying a cookie that is stored in the one or more objects, the cookie corresponding to the geographic location; and in response to the identifying of the cookie, modifying an electronic page available to the device based on the cookie.

2. The computer system of claim 1, wherein the one or more objects comprise a folder, and wherein the searching comprises searching within a plurality of other folders that is each associated with a different geographic location and searching a global folder on the device containing a global cookie that is accessible in multiple geographic locations.

3. The computer system of claim 2, wherein the other folders and the global folder are stored in a hierarchical manner, in which the folder and the other folders are sub-folders of the global folder.

4. The computer system of claim 1, wherein the operations further comprise:

receiving user input at the device;

generating a notification requesting to remember the user input received when the device is within a proximity of a GPS coordinate of the geographic location;

receiving a response instructing to remember the user input received when the device is within the proximity of a GPS coordinate of the geographic location; and generating the cookie designated for the geographic location based on the user input.

5. The computer system of claim 1, wherein the operations further comprise:

providing access to the cookie when the device is within a proximity of a GPS coordinate of the geographic location;

detecting, at least in part via the sensor data, that the device is moving away from the geographic location; and denying access to the cookie when the device has moved away from the geographic location.

6. The computer system of claim 1, wherein the cookie is labeled at least in part with a name of the geographic location.

7. The computer system of claim 1, wherein the cookie has an extension or an indicator that corresponds with the geographic location.

8. A method comprising:

receiving sensor data from a device of a user, the sensor data including Global Positioning System (GPS) data, Wi-Fi signal data, cellular signal data, Bluetooth signal data, or Near Field Communication (NFC) data;

determining a geographic location of the device based on the sensor data;

searching, among a plurality of items on the device, for a first item that is associated with the geographic location;

identifying, from within the first item, a cookie that corresponds to the geographic location; and in response to the identifying of the cookie, modifying an electronic page available to the device based on the cookie.

9. The method of claim 8, wherein the plurality of items comprises a plurality of folders, and wherein a global folder is stored on the device, the global folder containing a global cookie that is accessible in a plurality of geographical locations.

10. The method of claim 9, wherein the plurality of folders and the global folder are stored in a hierarchical manner, in which the plurality of folders are sub-folders of the global folder.

11. The method of claim 8, further comprising:

providing access to the cookie when the device is present within a proximity of a GPS coordinate of the geographic location;

detecting, at least in part via the sensor data, that the device is no longer within the proximity of the GPS coordinate of the geographic location; and denying access to the cookie when the device is no longer within the proximity of the GPS coordinate of the geographic location.

12. The method of claim 8, wherein the cookie is labeled at least in part with a name of the geographic location.

13. The method of claim 8, further comprising:

receiving a user input at the device;

generating a notification requesting to remember the user input received when the device is within a proximity of a GPS coordinate of the geographic location;

receiving a response instructing to remember the user input received when the device is within the proximity of a GPS coordinate of the geographic location; and generating the cookie designated for the geographic location based on the user input.

14. The method of claim 8, wherein the cookie has an extension or an indicator that corresponds with the geographic location.

15. A non-transitory machine-readable medium having stored thereon machine-readable instructions executable to cause a machine to perform operations comprising:

receiving Global Positioning System (GPS) data from a device of a user;

analyzing the received GPS data to determine a geographic location of the device;

searching, on the device, for a folder that is associated with the geographic location;

identifying a cookie that corresponds to the geographical location and that is stored in the folder; and in response to the identifying of the cookie, modifying an electronic page available to the device based on the cookie.

16. The non-transitory machine-readable medium of claim 15, wherein the searching comprises searching within a plurality of other folders that is each associated with a different geographic location, and wherein a global folder is stored on the device, the global folder containing a global cookie that is accessible in all geographical locations.

17. The non-transitory machine-readable medium of claim 16, wherein the plurality of other folders and the global folder are stored in a hierarchical manner, in which the other folders are sub-folders of the global folder.

18. The non-transitory machine-readable medium of claim 15, wherein the operations further comprise:

providing access to the cookie when the device is present at the geographic location;

detecting, at least in part via the GPS data, that the device has departed the geographic location; and denying access to the cookie when the device is away from the geographic location.

19. The non-transitory machine-readable medium of claim 15, wherein the operations further comprise:
   receiving user input at the device;
   generating a notification requesting to remember the user input received when the device is at the geographic location;
   receiving a response instructing to remember the user input received when the device is at the geographic location; and
   generating the cookie designated for the geographic location based on the user input.

20. The non-transitory machine-readable medium of claim 15, wherein the cookie has an extension or an indicator that corresponds with the geographic location.

* * * * *